(12) United States Patent
Simontacchi et al.

(10) Patent No.: US 10,273,682 B2
(45) Date of Patent: Apr. 30, 2019

(54) FIRE PROTECTION RETROFITS FOR HIGH-RISE BUILDINGS

(71) Applicant: Firefree Coatings, Inc., San Rafael, CA (US)

(72) Inventors: John Simontacchi, San Rafael, CA (US); Bruno Tapolsky, Tiburon, CA (US)

(73) Assignee: Firefree Coatings, Inc., San Rafael, CA (US)

(*) Notice: Subject to any disclaimer, the term of this patent is extended or adjusted under 35 U.S.C. 154(b) by 0 days.

(21) Appl. No.: 15/792,660

(22) Filed: Oct. 24, 2017

(65) Prior Publication Data

US 2019/0040627 A1 Feb. 7, 2019

Related U.S. Application Data

(60) Provisional application No. 62/412,218, filed on Oct. 24, 2016.

(51) Int. Cl.
| | | |
|---|---|---|
| *E04B 1/94* | (2006.01) | |
| *E04H 1/04* | (2006.01) | |
| *E06B 5/16* | (2006.01) | |
| *E04C 3/07* | (2006.01) | |
| *E04C 3/04* | (2006.01) | |

(52) U.S. Cl.
CPC ............... *E04B 1/944* (2013.01); *E04C 3/07* (2013.01); *E04H 1/04* (2013.01); *E06B 5/161* (2013.01); *B32B 2305/022* (2013.01); *B32B 2307/3065* (2013.01); *E04C 2003/0482* (2013.01)

(58) Field of Classification Search
CPC .... E04B 1/944; E04C 3/07; E04C 2003/0482; E06B 5/161; E04H 1/04; B32B 2307/3065; B32B 2305/022
See application file for complete search history.

(56) References Cited

U.S. PATENT DOCUMENTS

| | | | | |
|---|---|---|---|---|
| 2017/0130463 A1* | 5/2017 | Taing | ..................... | E04F 13/081 |
| 2017/0362835 A1* | 12/2017 | Nielsen | ............. | E04F 15/02188 |
| 2018/0187416 A1* | 7/2018 | Hauber | .................... | B32B 13/12 |

* cited by examiner

*Primary Examiner* — Joshua K Ihezie
(74) *Attorney, Agent, or Firm* — Thomas M. Freiburger

(57) ABSTRACT

Buildings, particularly high-rise buildings, are retrofitted with a fire resistant liquid-applied material, preferably a material that intumesces with heat, where the exterior of the building is formed of metal clad combustible foam composite panels. Once the fire resistant coating has been applied, new thin panels matching the original fascia are installed outside the original composite panels, with space between, so that the appearance of the building is maintained.

16 Claims, 6 Drawing Sheets

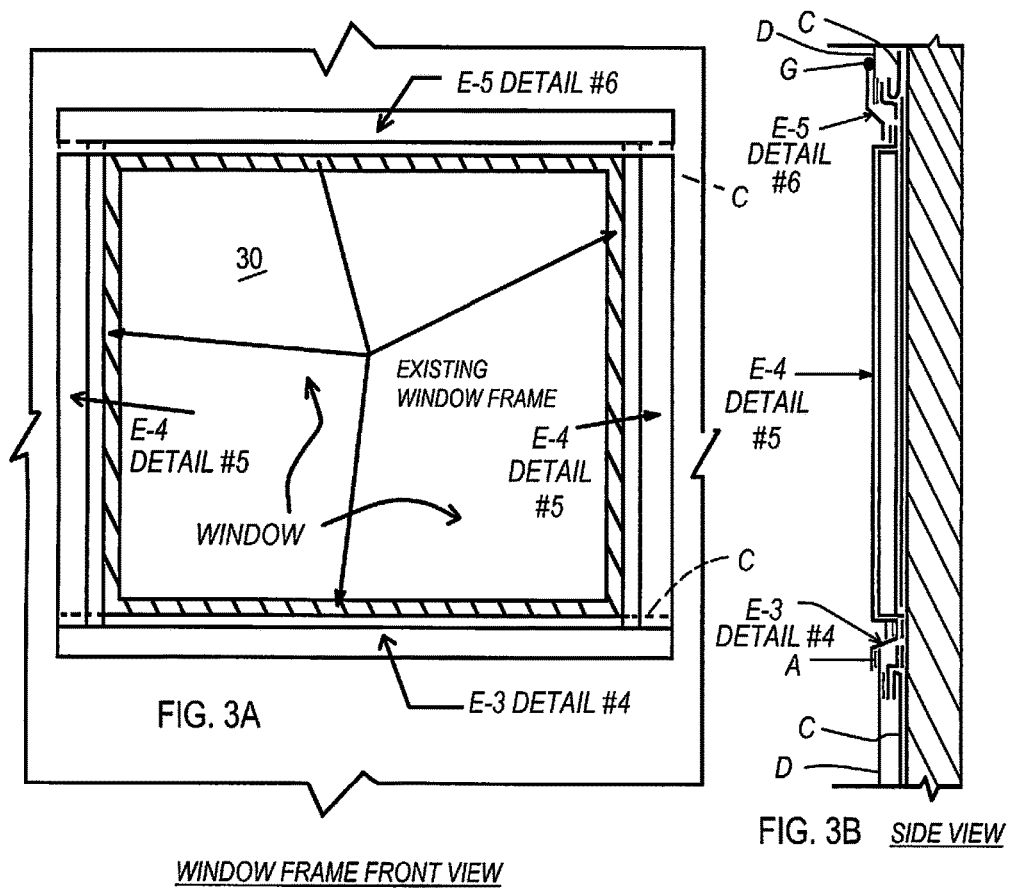

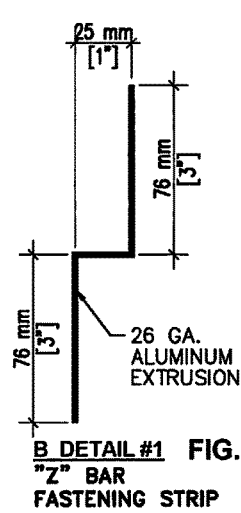
B DETAIL #1 FIG. 6A
"Z" BAR
FASTENING STRIP
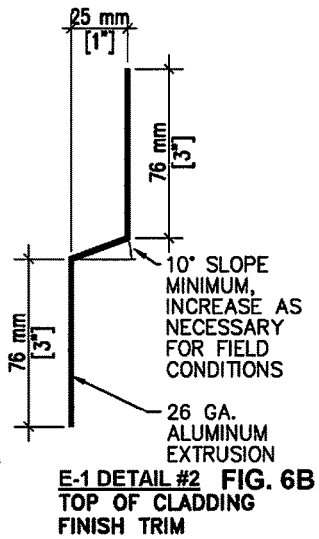
E-1 DETAIL #2 FIG. 6B
TOP OF CLADDING
FINISH TRIM
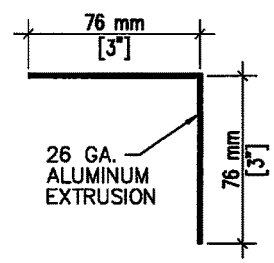
E-2 DETAIL #3 FIG. 6C
INSIDE CORNER
HORIZ/VERT TRIM
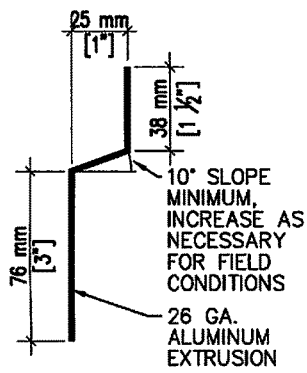
E-3 DETAIL #4 FIG. 6D
CLADDING TRIM AT
WINDOW SILL
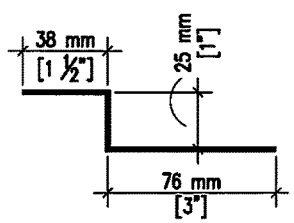
E-4 DETAIL #5 FIG. 6E
CLADDING TRIM AT
WINDOW/DOOR JAMB
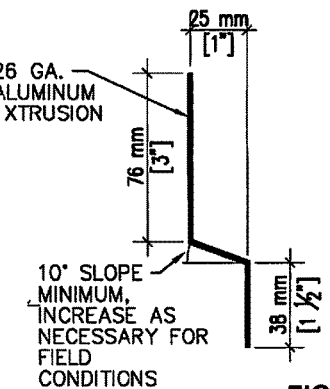
E-5 DETAIL #6 FIG. 6F
CLADDING TRIM AT
WINDOW/DOOR HEAD

FIRE PROTECTION RETROFITS FOR HIGH-RISE BUILDINGS

This application claims benefit of provisional application Ser. No. 62/412,218, filed Oct. 24, 2016.

BACKGROUND OF THE INVENTION

This invention concerns fire protection, particularly inhibiting the spread of fires in high-rise buildings, also in other buildings.

Over the last several years, there have been a series of fires in Dubai and surrounding Emirate high-rise buildings, as well as in England, where the buildings had aluminum and combustible foam composite clad panels as the exterior finish. Fires have started from both the interior and exterior sides of the building.

The combustible aluminum (or other metal) faced cladding panels are a primary source of the problem, in that the fire quickly heats the panel, which in turn ignites the interior combustible polyurethane foam insulation and other type of foam insulations. This process results in a fire that spreads rapidly up the building's exterior wall surface; possibly entering the interior of other units, through the heat fractured exterior side of glass windows exposed to the fire or from open, fire damaged cladding panel joints.

The interior fire spread is attributable to two independent conditions: (1) a fire originating inside a unit resulting in flashover, which in turn, blows out exterior wall windows; whereby, the interior fire's resultant "blow torch" type flame exits the now open window area and ignites the exterior cladding; and (2) exterior cladding fires entering the interior of the building through either a broken window or open, fire damaged cladding panel joints and spreads into and throughout the unit, and possibly into interior utility chase areas.

There are two parts that need to be addressed in order to provide a solution to the problem: one is to address the exterior portion of the fire issue, and the second is to address the interior portion of the fire issue.

1. Exterior Fires

Heat from an exposure fire on exterior insulated cladding panels will quickly result in ignition of the combustible foam insulation within the sandwiched panel.

The fire generated by the ignited foam will travel upward along the exterior surface of the building, as well as migrate into the interiors of units, through blown-out exterior windows or open, fire damaged cladding panel joints exposed to the fire. These cladding fires are hard to extinguish, due to all of the potential access areas that exist during a fire that expose typically concealed combustible insulation into which the fire can penetrate.

Furthermore, once the fire starts, it becomes unstoppable, as the combustible foam fuel source essentially becomes one solid mass across the entire width and height of the building, due to the construction features of the cladding-combustible polyurethane foam insulation material, and other types of foam insulation materials exposed along all four sides, while sandwiched (front & back) between thin-gauge aluminum panels.

SUMMARY OF THE INVENTION

Firefree Coatings Inc. of San Rafael, Calif. has developed an extensive viable retrofit concept for the protection of combustible clad high-rise buildings, utilizing its proprietary Firefree 88, a commercially available fire retardant and fire resistant coating, or using another product of essentially equal performance. This method of protection, which will not alter the exterior appearance of the building, can be implemented without major displacing of the building occupants or disrupting the building's daily operations. This retrofit operation can be accomplished through a specialized contractor strictly dedicated to this work.

Exterior Building Retrofit to Ensure Proper Fire Protection:

The areas on combustible clad buildings that need to be protected encompass all exterior terrace areas used for residential and commercial occupancy, and all ground, street and plaza level areas of buildings, where cladding extends to these levels. The ground, street, and plaza levels provide an exterior area where external fire sources may originate, whereas terraces represent areas where external fire sources may exist to ignite the cladding, and are also vulnerable to interior fires spreading to the exterior through their open or closed doors. Interior fire spread to the exterior is also possible through building windows, interior sheetrock walls, interior sheetrock ceilings and shaft or chase walls. Firefree Coating Inc.'s proposal, to ensure protection from ignition of the building's cladding, will be easy to implement. This current retrofit proposal for the protection of both the interior and exterior of the buildings is based on an extensive level of testing that has been performed at internationally recognized fire testing laboratories.

Following is a simplified overview of the proposed protection process:

a. Fire caulk all existing panel joints at all areas to be retrofit including all exposed terrace wall and ceilings areas and at all ground, street and plaza level walls, including around any door openings (glass or other) using either Hilti or 3M fire caulk or similar liquid-applied thin film intumescent coating material.

b. Coat the existing exterior wall and ceiling cladding surrounding the building terrace areas, and around the exterior perimeter wall surfaces at all ground, street and plaza levels, with Firefree 88 (or essentially similar material).

The proposed cladding protection scheme includes the installation of both vertical and horizontal, sub frame Z-channel standoffs overlaid on both sides with double-faced 3M or equal fire-resistant tape. The sub frame Z-channel is attached to the building's present surface area aluminum cladding, over which FF 88 is then applied at about 60 mils dry/90 mils wet coating thickness to meet, at a minimum, the ASTM E 119 thermal barrier fire test standard for metal/foam/metal composite panels. The coating thickness could be in a range of 60 mils to 120 mils wet/40 mils to 80 mils dry. Immediately after the FF 88 has been applied, the Z-channels' surface 3M tape's top protective strip is removed, exposing the tape's adhesive surface, on which the new top surface aluminum fascia panel and related panel finish trim pieces, which match the existing exterior building finish, will be attached over the original cladding panel now coated with FF 88. The sub-frame's Z-channel frame provides sufficient rigid support to prevent accidental physical contact damage to the new panels installed on the wall and ceiling surfaces being retrofitted. Note that C-channel standoffs could be used in many locations if desired. Also, the standoffs could be secured to existing panels by small rivets, although a strong adhesive is preferred. The adhesive could be applied on the job rather than pre-applied.

c. Where cladding extends down to the ground, street and plaza levels, provide similar protection, as described under a and b above, for all cladding from ground, street and plaza levels around the entire building perimeter where exposed at these levels, up through a height to be determined by building conditions. All areas of potential fire risk should be included (regardless of height), such as balconies, terraces, etc. Coating of the interior side of all exterior walls, interior ceilings and chase wall areas as defined herein, and as described below, will reduce the need to retrofit an entire exterior of a building.

d. Install all aluminum finish trim pieces at all retrofitted areas and seal all trim to wall joints with a sealant (Sika or equal).

This method of protection will not alter the exterior surface appearance of the building, while meeting the required fire resistance standards for all the vulnerable exterior areas of the cladding where fires would and have occurred on such buildings. Any anodizing or other surface color treatment on the existing aluminum panels will be matched.

As a basis for our analysis to our proposed retrofit solution to the exterior cladding fire problem, Firefree Coatings, Inc.'s, FF88 fire resistant coating has undergone extensive testing on numerous material substrates including thin gauge metal and aluminum, polyurethane foam and metal/foam/metal composite panels to fire test standards as follows:

1. ASTM E 119 2 hour vertical wall test on 10 gauge metal
2. ASTM E 119/ASTM 814 1 hour penetration test on 26 gauge aluminum.
3. ASTM E 119 Thermal barrier test on a 26 gauge metal/polyurethane foam/26 gauge metal panel
4. FM4880 Room Corner Test on wood
5. NPFA 286 Room Corner Test on polyurethane foam Other products may be used, but generally would be required in larger quantity to come close to the performance of FF88.

The main issue of importance in regards to the clad panels is being able to keep the backside temperature between the metal and foam of the panel below 121° C. (250° F.), which is the basis for the ASTM E 119 Thermal Barrier Test Standard established for foam and foam composite panels. The second test standard that has a considerable impact on foam and foam composite panels is the FM 4880/NFPA 286 Room Corner Test standard that details a product's ability to prevent flame spread, smoke development and flashover (this is especially critical at all recessed terrace balcony areas).

The above listed testing clearly shows the ability of the FF88 coating to meet these stringent standards.

2. Interior Fires:

With an interior fire, heat, flame, and gases can blow out a window, due to flashover, leading to the ignition of the exterior building cladding. An interior fire, not controlled or extinguished by automatic sprinklers can, over time, penetrate the interior side of gypsum perimeter walls, gypsum perimeter ceilings and gypsum shaft walls, allowing the fire to heat the back side of the exterior aluminum cladding panels and ignite the interior combustible sandwiched foam. Once ignited, the fire will travel upward along the exterior wall surface of the building, as well as penetrating back into the interior of other units or rooms within the building, through exterior windows or terraces' glass windows/doors, which break, due to the intensity of flame exposure.

Interior fire performance of FF 88 has already been validated through the extensive fire testing performed on numerous gypsum board wall and ceiling assemblies tested to the ASTM E 119 1 and 2 hour fire test standards and the severe FM 4880 Room Corner Test and FM 4975 ceiling test on gypsum board, cellulose tiles and wood. Firefree Coatings, Inc. is Factory Mutual listed and labeled.

As part of our analysis as to our proposed portion of the interior retrofit proposal we reviewed the following:

1. ASTM E 119 1 hour gypsum wall test data.
2. ASTM E 119 2 hour gypsum wall test data.
3. ASTM E 119 1 hour ceiling test data on solid joists and engineered lumber.
4. ASTM E 119 and ASTM E 1632 individual component testing on gypsum board.
5. ASTM E 119 1 hour loaded metal stud wall test.
6. FM 4880 Room Corner Test
7. FM 4975 Ceiling Test
8. Compartmentation documentation for the interior of building structures.
9. Evaluation of interior room fire data from the ongoing Australian Department of Housing Project.

The area most affected by an interior fire is the interior side of the exterior wall, the gypsum board ceiling and shaft wall areas along with areas around wall openings (windows) and glass doors. The proposed retrofit solution for the interior is to coat the interior side of all exterior walls, and ceiling areas attached to the interior/exterior wall areas. In addition, all shaft wall areas will be required to be coated to prevent flame penetration into open shaft spaces. The wall and ceiling gypsum board is fastened to metal wall studs and metal ceiling joists. As part of our analysis, we are taking into consideration the fact that metal studs, while considered non-combustible, will fail at 594° C. (1100° F.). Taking the metal failure rate into consideration, the coating thickness applied to the wall and ceiling areas will have to provide a low enough backside temperature to prevent metal stud/joist failure which would lead to gypsum board failure.

Based on all of our data, by coating the interior side of the exterior wall and adjacent ceiling area, the coating will dramatically reduce the chance of a room flashover and failure of the gypsum interior/exterior wall and adjacent ceiling area, preventing such a failure from progressing to a failure of the exterior wall cladding system.

FF88 coating is a passive, in place system, that does not rely on sprinklers to provide a high level of fire protection and does not have the problems associated with sprinklers, such as closed system valves, loss of water supply and/or pressure, or electrical failure that would shut down fire service pumps and render the sprinkler system inoperative.

The prevention of interior fires using FF88 has been clearly demonstrated to prevent interior fires from spreading to the exterior of a building, through extensive ASTM and Room Corner testing standards. However, at the present time, our main focus in this proposed retrofit program, addressed in herein, is to substantiate the viability of FF 88's protection capability to prevent fires, whether they be generated from inside or outside the building, exposing and igniting the building's exterior aluminum/foam combustible cladding from spreading along the exterior surface of the building.

Based on our extensive testing on gypsum board wall and ceiling assemblies, we are recommending the following protection:
1. Interior side of exterior walls, which have exposing windows and/or terraces: apply a 20 mils (when dry) coating thickness to all wall areas as described, or a range of 15 to 40 mils dry.
2. Entire room ceiling: apply a 35 mils (when dry) coating thickness, or a range of 20 to 25 mils dry.

SUMMARY: SOLUTION AND BENEFITS

Firefree's proposed solution offers the most cost effective method of protecting buildings (both existing and new) that have combustible aluminum clad paneling. By utilizing this proposed solution, the entire exterior cladding of existing buildings will not have to undergo extensive retrofitting to improve fire protection of the existing cladding. The benefits will include the following:
1. FF88's interior protection adds no discernable weight to the structure. Likewise, the proposed exterior protection adds virtually no additional dead load to the structure. Therefore, the proposed retrofit solution does not affect the building's current design parameters, nor does it subject the building to foundation modifications.
2. Minimal damage to a building should a fire occur.
3. Test-verified interior and exterior building fire protection is achievable in a much shorter time and at less cost than any other retrofit solution (none presently exists), due to:
    a. Quick and simple retrofit approach.
    b. Elimination of lost rental income/building operational downtime, and both temporary occupant relocation expense and inconvenience, while not rendering the building uninhabitable during retrofit work.
4. This level of protection will allow the fire department to respond to a fire of limited magnitude, and be able to effectively and successfully extinguish the fire in a relatively short period.
Other benefits related to quick fire extinguishment are:
    Firefighters are subjected to a less dangerous fire
    Limited manpower and water resources are utilized
    Building fire and water damage and clean-up are relatively minor, and
    Building damage is minimal, allowing for limited inconvenience and disruption to the occupants, and quick repairs to the damaged areas.
5. After a fire, any interior exposed FF 88 that has expanded (intumesced), at best case scenario, need only be scraped off and the involved area recoated with FF 88 (as a painted-on coating), and reapplying the previous finish or worst case scenario, limited replacement of possibly damaged gypsum board at the ceiling and wall(s). Any exterior fire/heat damaged or missing surface aluminum fascia will only require a quick repair, involving removal of any damaged fascia panels, removal/replacement of any damaged "Z"-BAR standoffs, scraping off of the charred FF88, reapplying FF 88 and reattaching new aluminum fascia panels. All retrofit work can be performed while the building is occupied, except for the specific area where repair work is underway.

Firefree Coatings Inc.'s staff has extensive experience as construction litigation experts, working on projects to bring reasonable solutions to correct defective construction problems and fire issues for over 18 years. Firefree 88 coating has been fully tested to International standards (American Standard Testing Materials (ASTM), British Standards (BS), FM, Australian Standards (AS), and others), with the testing conducted at IAS/ICC certified fire laboratories. Firefree 88 has been subjected to the widest range of testing on numerous material substrates, which allows FCI to bring a viable solution to high-rise combustible cladding fires.

As noted above, the invention encompasses the use of other fire protective coatings, but equal performance cannot be expected.

DESCRIPTION OF THE DRAWINGS

FIGS. 3A and 3B are front elevation and side elevation sectional views illustrating the system of the invention.

FIGS. 6A-6F are a collection of views showing retrofit brackets and trim for the system of the invention.

DESCRIPTION WITH REFERENCE TO DRAWINGS

Figure 1:
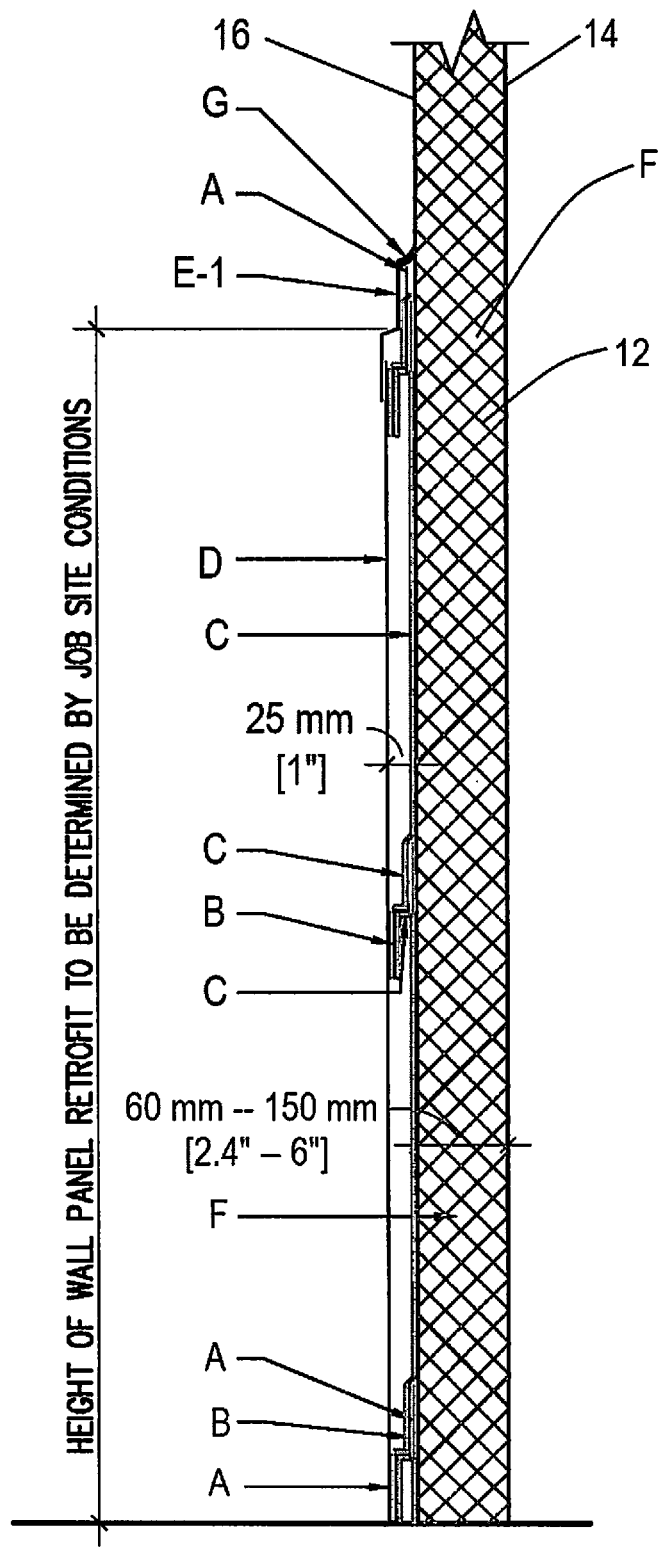
FIG. 1 is a schematic side elevation view in section through a wall of a high-rise building, illustrating the invention.

The drawings show and explain details of the retrofit system of the invention. FIG. 1 shows, in elevational section, an existing exterior wall cladding F on a high-rise building. The wall cladding F is composed of a foam core 12, typically a polyurethane foam, with an aluminum "skin" 14 on the inner side and another aluminum skin 16 on the outer side. This provides the primary exterior appearance of the building, while providing insulative qualities. As an example, the thickness of the cladding F may be about 60 mm to 150 mm (about 2.4 inches to 6 inches). The method and system of the invention add a further, spaced-outward aluminum panel D to the cladding. In a preferred form of the invention, this is achieved by use of "Z" shaped bars acting as spaces or standoffs, shown at B in the drawings (also called "Z bar" herein). The Z bars are elongated, seen only in cross section in FIG. 1. Note that at least in some cases a C-shaped channel could be used for the standoffs. These Z bars are attached to the existing aluminum face 16 of the cladding panel F using double-sided adhesive tape as shown at A in the drawings. This tape can be the product 4900/5000 series adhesive tape provided by 3M (Minnesota Mining & Manufacturing Co.), or an equal product. The tape is positioned between the wall side of the Z bar and the aluminum skin 16 of the cladding panel F. The tape can be applied to the Z bar first, then pressed into position on the wall panel.

As shown in the drawing, another layer of the double-sided adhesive tape A is applied on the outer side of each Z bar, i.e. the side away from the building. The tape can be applied with its outer release strip still in place, this protective strip being removed only when the new aluminum fascia panel D is to be attached. The Z bar B can be of thin metal, e.g. aluminum, about 26 gauge. Similarly, the retrofitted wall fascia panel can be of about 26 gauge aluminum. The finish of the added panel D will match that of the existing cladding skin 16, so that the appearance of the building remains the same.

Prior to installation of the new aluminum panels D, a fire resistant coating C is applied to the outside of the cladding F, i.e. on the outside of the existing aluminum skin 16. Preferably the product Firefree 88 (FF88) is used, a fire resistant coating produced by Firefree Coatings, Inc. of San Rafael, Calif. This product is applied as a paint, and preferably in a thickness of about 60 mils dry/90 mils wet. The product is intumescent when subjected to heat associated with a fire, swelling to many times its original thickness. For that reason, the spacing from the existing cladding skin 16 to the new panel D preferably is about 1 inch (24-25 mm), to allow for the intumescence.

The fire resistant coating C, as shown in the drawing, is applied not only against the surface 16 but also covering the exposed surfaces and underside of each Z bar, and, i.e. all surfaces and attachments associated with the cladding F, in the areas to be covered using the system of the invention.

As noted in the drawing, an exterior top finish fascia flashing E is added just above the top end of each newly added panel D.

As indicated in the drawing, a sealant G preferably is added at the outside of the installation, at top and bottom of the exposed fascia flashing and also at left and right sides. The sealant may be a Sika product. Further, fire caulking should also be applied at all vertical and horizontal cladding panel joints in retrofit areas. Preferably a 3M fire caulking is used for this purpose. The fire caulk is indicated at H, not seen in FIG. 1 but indicated in FIG. 2.

Figure 2:
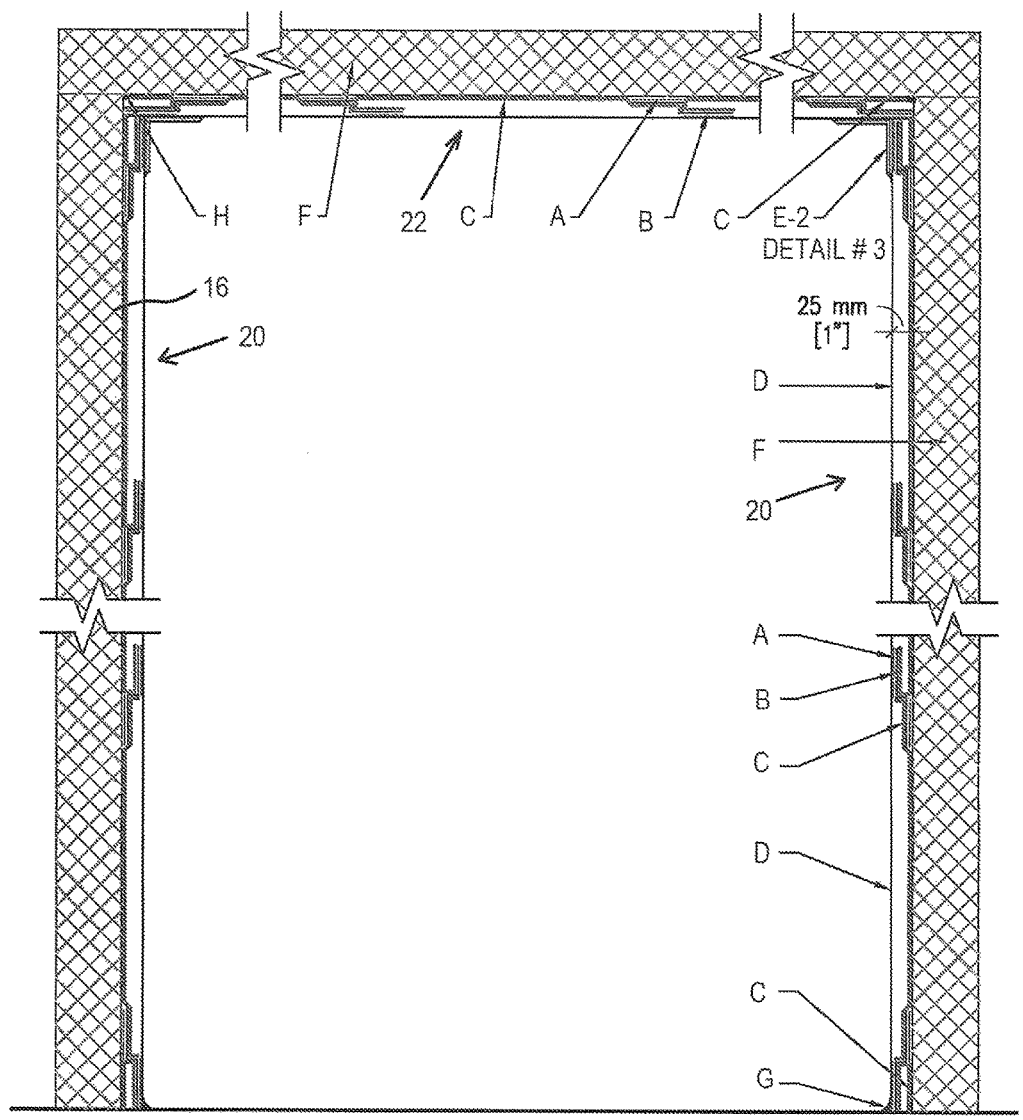
FIG. 2 is a similar elevation view but showing the system of the invention as installed on walls and overhead ceiling at a terrace of a high-rise building.

The following is a listing of elements and components shown in FIG. 1 and other drawings, represented by letters:
  A. Double sided adhesive tape 3M 4900/5000 series
  B. 26 GA. metal "Z" bar (see FIG. 6A)
  C. 60 mils dry/90 mils west (1500 microns dry/2250 microns wet) Firefree (FF88) fire resistant coating
  D. New 26 GA. aluminum fascia cladding panel with finish to match existing panel finish
  E. Exterior top finish fascia flashing (see FIG. 6B)
  F. Existing aluminum/foam cladding panel
  G. Sealant at top of exposed fascia flashing (sika)
  H. Note: install 3M fire caulking at all vertical and horizontal cladding panel joints in retrofit areas FIG. 2 is another elevation view in section, indicating the use of the invention to retrofit a terrace in a high-rise building, wherein two opposed exterior walls 20 and a ceiling 22 are retrofitted with the fireproofing and additional layer of aluminum panel. The fire caulking H is seen at locations where existing wall cladding panels F meet at corners. Note also that the sealant G is shown applied at those exterior corners, where an exterior finishing fascia flashing E-2 is positioned at interior corners where the newly added aluminum fascia panels D intersect.

Again, application of the FF88 fire resistant coating is indicated at C. This is applied to all existing surfaces of the existing wall cladding, on the exterior skin 16, the fire resistant coating being applied after addition of the Z bar standoff brackets, which are identified as B in the drawings. As explained above, release strips on the adhesive A that faces outwardly on the Z bars remains until the new aluminum sheets D are put in place, and thus this adhesive is protected against being covered or affected by application of the fire resistant coating.

FIGS. 3A and 3B show details of the retrofit around a window 30. A modified flashing E-4 is used at sides of the window, that flashing trim being shown in cross section in detail in FIG. 6E. At top and bottom of the window, different fascia trims can be used, as exemplified by the trim pieces E-5 and E-3 in FIG. 3B, with detailed views of these cross sections seen in the details of FIGS. 6F and 6D, respectively. The top leg of flashing trim piece E-5 could be underneath the added panel D extending above if desired, although shown on the outside in FIG. 3B. This will depend on local conditions. Note that the FIG. 6C shows the inside corner added fascia trim pieces E-2 used in the wall/ceiling corners as shown in FIG. 2. The top finish fascia flashing trim piece E shown in FIG. 1 is detailed in FIG. 6B. FIG. 6A (detail No. 1) shows the primary Z bar bracket B.

In FIGS. 3A and 3B the fire resistant coating is again indicated at C.

Figures 4A, 4B:
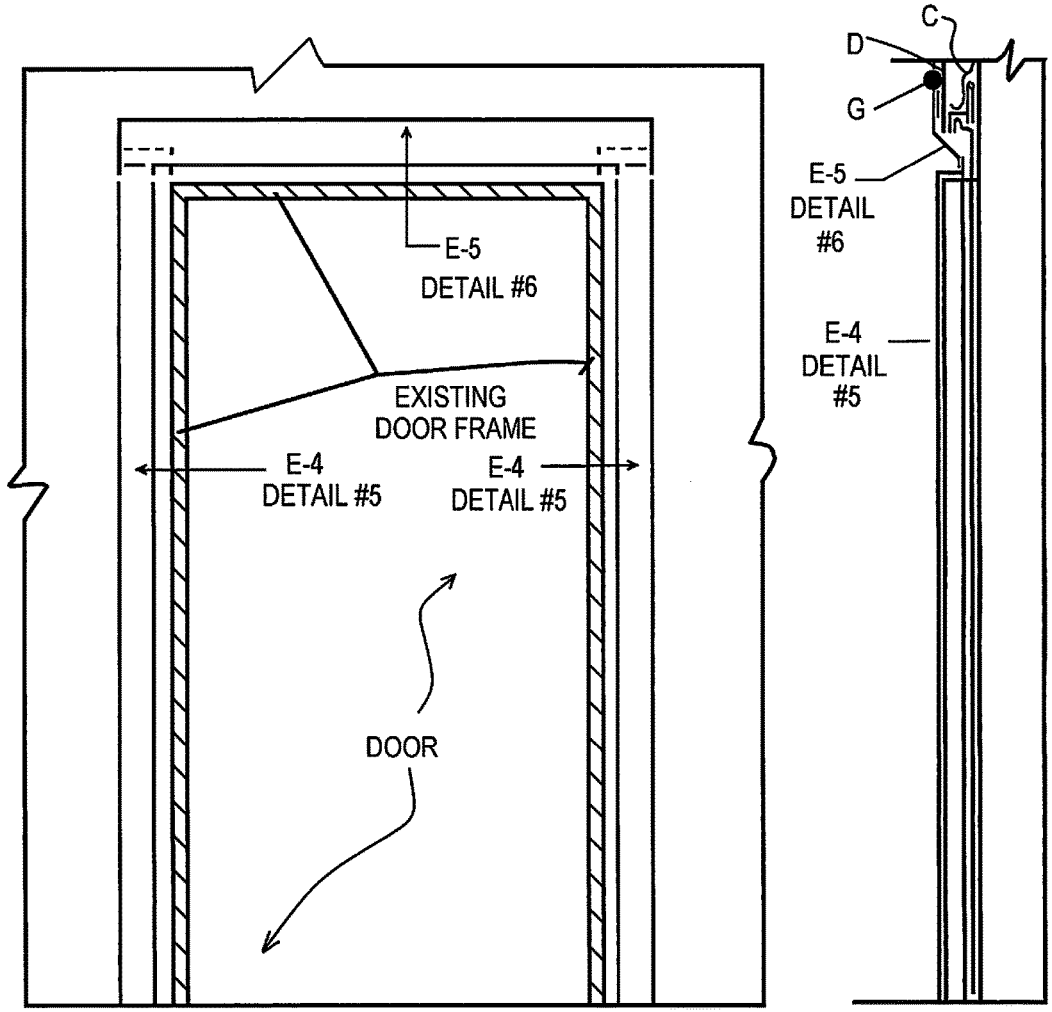
FIGS. 4A and 4B are further front and side elevational section views showing the system of the invention applied at a door frame.

FIGS. 4A and 4B are elevation and section views showing a door retrofit according to the invention. These details are similar to the window details. Note that above the door (FIGS. 4A and 4B) and above the window (FIGS. 3A and 3B) the newly added aluminum panel sheet D above the door or window may be more outwardly prominent than the existing window trim. The fascia flashing piece E-5 therefore can be installed with one leg over the outside of the new aluminum sheet fascia D, with the trim piece then transitioning into an attachment just above the window. The sealant G applied at the top of the fascia piece E-5 is important as a moisture barrier.

Figure 5:
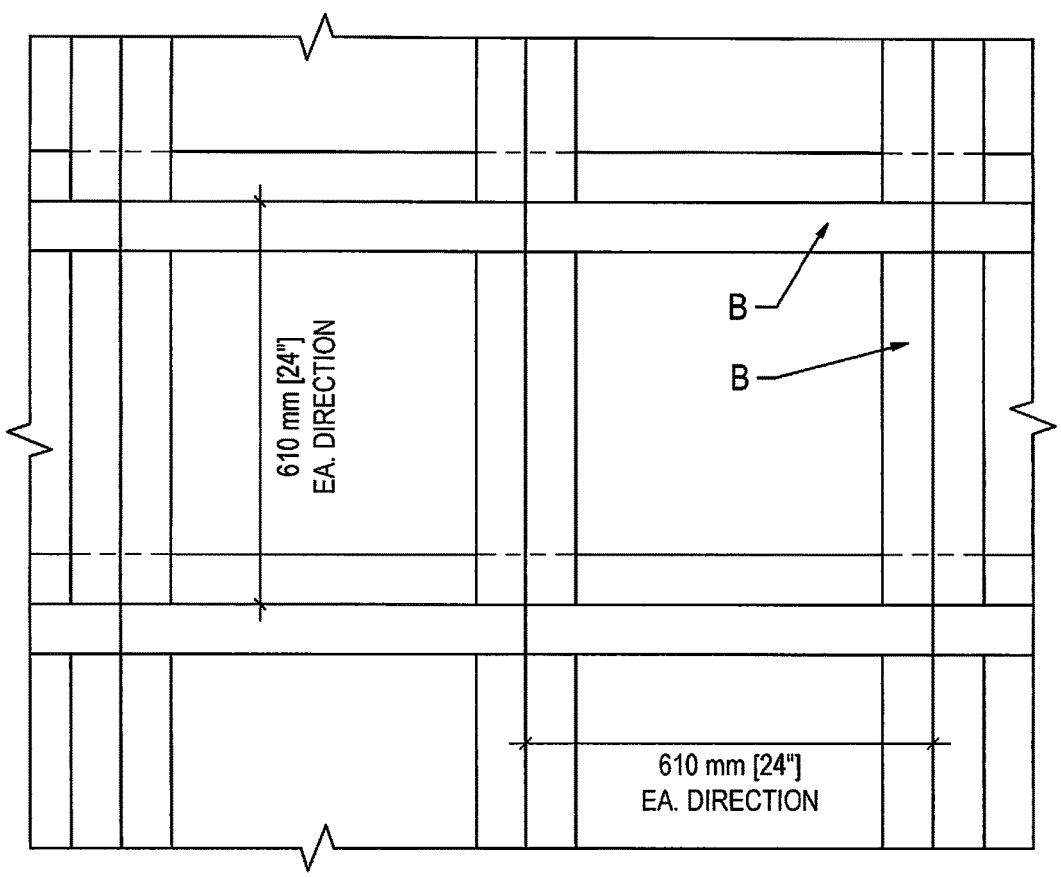
FIG. 5 is a plan view showing exterior wall and ceiling layout for a component of the invention.

FIG. 5 is a view schematically indicating layout of Z bars B. In a typical installation the Z bars B can be, for example, at two foot spacing both horizontally and vertically. This grid pattern can be with closer spacing if desired (or wider spacing), the spacing being that which is sufficient to hold the added aluminum panels, which can be 26 gauge as noted above, firmly and stably in position, resisting deformation due to wind.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:
1. A method for retrofitting a building having existing panels that are metal clad combustible foam composite panels to prevent fire spread at the exterior of the building, comprising:
  fire caulking all existing joints between panels in all areas to be retrofitted on the exterior of the building, up to a preselected level on the building,
  installing standoff brackets vertically and horizontally onto the existing panels of the building, each standoff bracket having a planar outer surface spaced away from the existing panel by a preselected distance, with the outer surface being parallel to the existing panel,
  coating the exterior surfaces of the existing panels, and also the installed standoff brackets, with a liquid-applied thin film intumescent fire retardant,
  installing metal new fascia panels over the coated existing panels, the new fascia panels substantially matching the existing panels in appearance, by attaching back sides of the new panels against the planar outer surfaces of the standoff brackets, and
  installing metal finish trim pieces at all retrofitted areas to cover gaps, and sealing all trim-to-wall joints with a sealant.

2. The method of claim 1, including performing the steps of fire caulking, installing standoff brackets, coating exterior surfaces and installing all-aluminum new fascia panels and trim panels on walls and ceilings of terraces and all ground level and plaza level walls, ceilings and door openings.

3. The method of claim 1, wherein the standoff brackets are Z-shaped.

4. The method of claim 3, wherein the standoff brackets have two parallel planar legs, one applied against the existing panels of the buildings and another having said planar outer surface to be engaged against back sides of the new fascia panels, with both legs having adhesive for securement to the existing panels and the new fascia panels, respectively.

5. The method of claim 1, wherein the standoff brackets have two parallel planar legs, one applied against the existing panels of the buildings and another having said planar outer surface to be engaged against back sides of the new fascia panels, with both legs having adhesive for securement to the existing panels and the new fascia panels, respectively.

6. The method of claim 1, wherein the standoff brackets have adhesive on said outer planar surfaces, the adhesive being covered with a release film when the standoff brackets are installed against the existing panels, with the release film being removed just before new fascia panels are installed.

7. The method of claim 1, wherein the metal finish trim pieces include top finish fascia flashing, under-window flashing, window and door side finish trim, and window and door top flashing.

8. The method of claim 1, wherein the thickness of the thin film intumescent fire retardant is about 90 mils wet and 60 mils dry.

9. The method of claim 1, wherein the thickness of the thin film intumescent fire retardant is in the range of about 60 mils to 120 mils wet and 40 mils to 80 mils dry.

10. The method of claim 1, wherein the metal new fascia panels are aluminum, of about 26 gauge thickness.

11. The method of claim 1, wherein the metal new fascia panels have a thickness in the range of about 20 gauge to 30 gauge.

12. The method of claim 1, wherein the standoff brackets have a length that creates a space of about one inch between the existing panels and the metal new fascia panels.

13. The method of claim 1, wherein the standoff brackets have a length that creates a space of about ½ inch to 1½ between the existing panels and the metal new fascia panels.

14. The method of claim 1, wherein the existing foam composite panels have aluminum cladding and the new fascia panels are aluminum.

15. The method of claim 1, wherein the coating of liquid-applied thin film intumescent fire retardant is at least sufficient to meet the fire standard ASTM E 119.

16. The method of claim 1, further including coating interior sides of all exterior walls, interior ceilings and chase wall areas of the building, reducing the need to retrofit the building's entire exterior.

\* \* \* \* \*